Feb. 9, 1971 I. H. CULVER 3,561,120
DISTANCE MEASUREMENT WITH FRICTION WHEEL DEVICES
Filed Jan. 24, 1969 2 Sheets-Sheet 1
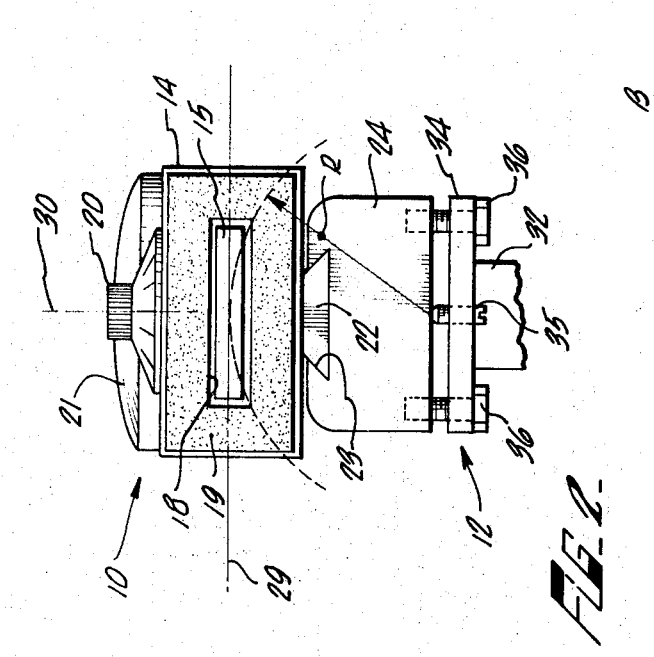
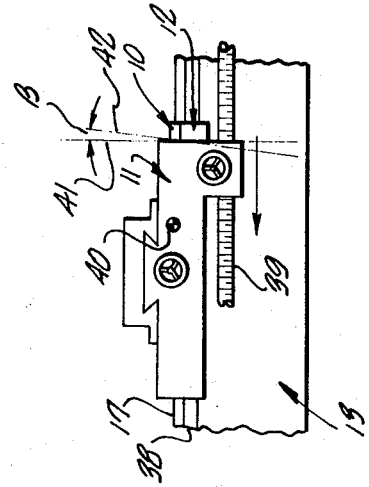
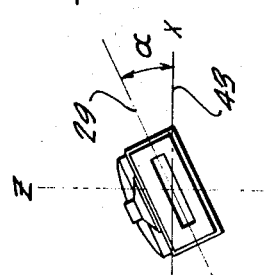
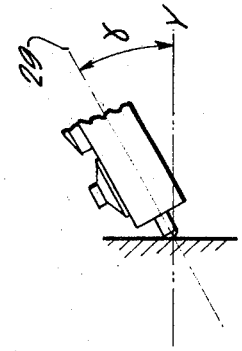
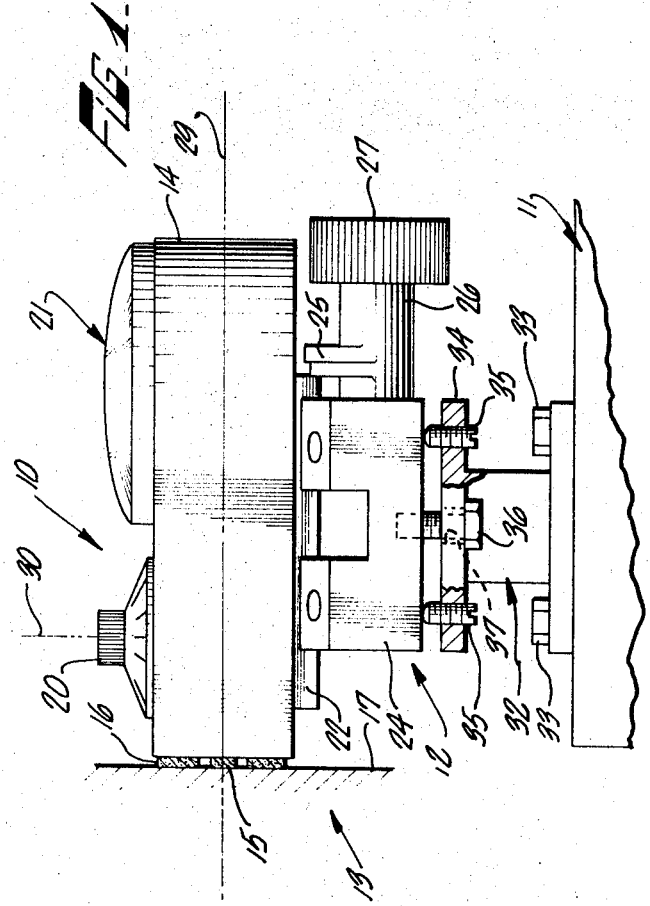
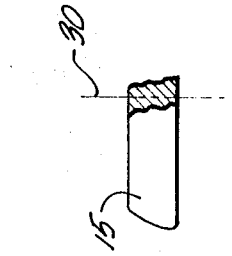
INVENTOR.
IRVEN H. CULVER
BY
Christie, Parker & Hale
ATTORNEYS.

Feb. 9, 1971   I. H. CULVER   3,561,120
DISTANCE MEASUREMENT WITH FRICTION WHEEL DEVICES
Filed Jan. 24, 1969   2 Sheets-Sheet 2

United States Patent Office 3,561,120
Patented Feb. 9, 1971

3,561,120
DISTANCE MEASUREMENT WITH FRICTION WHEEL DEVICES
Irven H. Culver, Playa del Rey, Calif., assignor to Primus Mfg., Inc., San Lorenzo, Puerto Rico, a corporation of California
Filed Jan. 24, 1969, Ser. No. 793,856
Int. Cl. G01b *3/12*
U.S. Cl. 33—125          6 Claims

ABSTRACT OF THE DISCLOSURE

A method for mounting a friction wheel distance measuring device to a machine tool, such as to a lathe carriage, to enable precise measurement of the extent of movement of the carriage along the lathe bed, e.g., which includes mounting the device on the carriage so that, when the carriage is stationary, the metering wheel of the measuring device is mounted slightly skew to the line of movement of the carriage along the bed by an amount and in a direction which automatically compensates for repeatability errors generated by non-reciprocal deflections of the carriage and the supporting bracketry of the measuring device.

REFERENCES TO RELATED PATENTS

It is believed that full understanding of this invention will be facilitated by reference to U.S. Pats. 3,307,265 and 3,378,929. Pat. 3,378,929 describes the basic type of measuring device with which this invention has utility. Pat. 3,307,265 describes another mounting method which may be used contemporaneously with this invention and which is referred to in the following description.

Field of the invention

This invention pertains to precision distance measuring in machine tools, for example, by use of friction wheel distance measuring devices.

Review of the prior art

Precision friction wheel distance measuring devices are known, see U.S. Pat. 3,378,929. Such devices have found wide acceptance throughout industry in many applications. A common use of such devices is in combination with machine tools where the devices are used to measure the distance one part of a machine tool is moved relative to another part of the tool. For example, a friction wheel measuring device is often mounted to a lathe carriage to engage a guideway surface of the lathe bed to measure the distance the carriage is moved along the lathe bed. It should be understood, however, that such devices are not restricted to use on lathes, and have in fact found many other uses including in coordinate measuring machines and precision positioning mechansms, as well as on any machine tool.

The friction wheel measuring device which currently is most widely used is shown in Pat. 3,378,929. This device is marketed in the United States by the assignee of this invention in conjunction with the trademark "Trav-A-Dial." The device features internal motion amplification of the rotation of the frictionally driven metering wheel so that the distance of travel monitored by the wheel is precisely presented on dials graduated in inches, and tenths, hundredths and thousandths of an inch. The measurement capacity of such devices, before recycling of the indicator dials occurs, is equal to the circumference of the metering wheel, which circumference is very accurately controlled.

A friction wheel measuring device having a readout capacity greater than the circumference of the metering wheel has been developed and is now being marketed by the assignee of this invention in conjunction with the trademark "Tedd." It was with the advent of such measuring devices that the problem solved by this invention was first identified. This problem is one of repeatability errors produced by the environment of the measuring device rather than by the device itself, and this problem must be clearly understood in order that the procedures taught by this invention may in turn be understood. A repeatability error is a failure of the device to read "zero" when returned to a "zero position" after motion away from and back to the zero position following movement of the device through several such cycles, each of which involves several inches of travel. Lack of repeatability can be quite troublesome where the measuring device is used in the machining of a complex part, which machining process may require several days' work by a skilled machinist.

The first generation measuring devices (see Pat. 3,378,929) described above have metering wheels having a circumference of six inches, and are warranted to be accurate to within one-thousandth inch per six inches travel. The extended readout devices (second generation) also use a six-inch metering wheel, but can be operated over distances of up to one hundred inches or more before recycling of the readout structure occurs. Basically, the first and second generation devices are essentially identical except with respect to the readout devices thereof. It would seem, therefore, that the accuracy and repeatability of the second generation device per inch of travel should be the same as that of the first generation device; it was soon discovered that, in practice, unexplained repeatability problems were encountered with the extended readout devices. More specifically, it was found that an extended readout device had rated accuracy per inch of travel and presented no repeatability problems when operated over short distances, but that the same device used in exactly the same mounting on the same machine tool showed repeatability errors, but not a change in accuracy, when operated a number of times over great distances. It was also found that the magnitude of the repeatability error varied, for the same device, from machine tool to machine tool even where the machine tools were of the same model number and originated from a common source. These findings indicated that the unexplained repeatability error was associated with the individual machine tools, but such findings did not identify the true cause of such errors.

SUMMARY OF THE INVENTION

This invention, considered as a whole, includes the identification of the problem which produced the previously unexplainable repeatability errors associated with operation of friction wheel measuring devices over extended distances for a reasonable number of cycles, say ten cycles, on machine tools such as lathes, milling machines and the like. Briefly, the errors are produced by non-reciprocal deflection of both the components of the machine tool itself, which components were formerly thought to be absolutely rigid, and of the structure mounting the measuring device on the machine tool. Such deflections are admittedly very slight, but they are sufficient in magnitude to produce reapeatability errors in a friction wheel measuring device operated over large distances; this fact testifies to the inherent great accuracy and sensitivity of such devices.

The invention provides a method for mounting the measuring device to compensate for repeatability errors generated by deflections in the tool itself and in the mounting structure for the measuring device. It is especially noteworthy that the practice of this method does not adversely affect operation of a measuring device when operated over short distances of travel, as might otherwise be expected.

Generally speaking, this invention provides a method of mounting a friction wheel measuring device to one of two relatively movable elements in a machine tool, e.g., so that the device accurately and repeatably measures the extent of relative travel of the elements. The elements are constrained to have only one intended degree of freedom of movement, and the device is mounted on the one element so that the metering wheel projects beyond the housing of the device into forceful frictional rolling engagement with a surface of the second element which is parallel to the direction of desired gross relative movement between the elements. In this context, the invention comprises, first, the step of determining the magnitude of repeatability error generated when the device is mounted with its plane of rotation parallel to the line of gross relative movement. Second, the method includes the step of adjusting the device on the one element so that the axis of metering wheel rotation is displaced from perpendicularity (or so that the plane of wheel rotation is displaced from parallelism) to the line of gross relative movement by an amount which compensates for the repeatability error.

That is, the device is intentionally mounted so that, in an at-rest state, the metering wheel appears to track skew to the direction of relative travel permitted between the two elements, and such angle of skew is of an amount which inherently compensates for repeatability errors which would otherwise be encountered. Such intentional initial skew mounting of the device, contrary to what would be expected, does not produce measurement errors, regardless of the amount of gross relative movement encountered between the elements.

The term "gross relative movement" is used in the present description, and in the appended claims, to designate the principal intended mode of movement relied upon to operate the measuring device, and to distinguish such mode of movement from the undesired and heretofore unsuspected very small movements which produce the problem overcome by the invention.

DESCRIPTION OF THE DRAWINGS

The above-mentioned and other features of this invention are more fully set forth in the following detailed description of a presently preferred embodiment of the invention, which description is presented with reference to the accompanying drawings, wherein:

FIG. 2 is a front elevation view of the measuring device of FIG. 1;

FIG. 3 is an enlarged fragmentary elevation view of a portion of the metering wheel of the device shown in FIGS. 1 and 2;

FIG. 4 is an elevation view showing use of the device to obtain the benefits of the structure shown in FIG. 3;

FIG. 5 is a front view of the measuring device and illustrates the nature of the problem solved by this invention;

FIG. 6 is an elevation view of the lathe with the measuring device mounted thereto;

FIG. 7 is a plan view of a portion of the lathe with the measuring device mounted thereto.

DESCRIPTION OF THE PREFERRED EMBODIMENT

Figure 1:
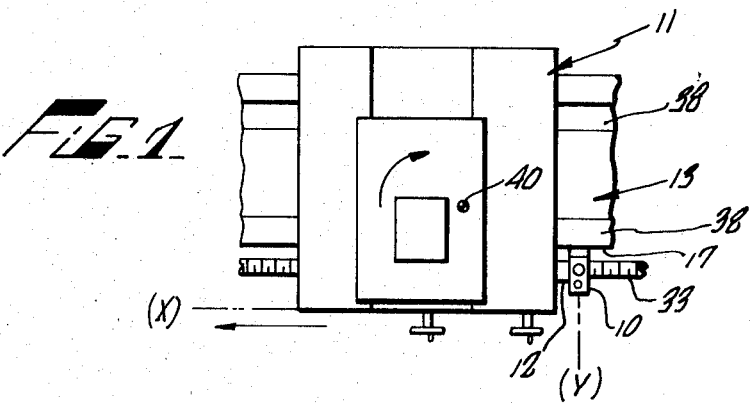
FIG. 1 is a side elevation view of a friction wheel measuring device mounted between two relatively movable elements (a lathe carriage and a lathe bed being selected for the purposes of illustration) the extent of which movement is to be measured.

FIGS. 1 and 2 illustrate the mounting of a friction wheel distance measuring device 10 to a lathe carriage 11, for example, by a mounting assembly 12 for measurement of the distance which the lathe carriage moves relative to the lathe bed 13. The measuring device includes a housing 14 within which is rotatably mounted a circular metering wheel 15 of carefully predetermined and known circumferential extent. The metering wheel is mounted in the housing so that the rim of the wheel projects beyond a front face 16 of the housing into contact wtih a measurement surface 17 defined by the lathe bed and along which measurements are to be made of the amount of travel of the lathe carriage relative to the bed. As shown in FIG. 2, the metering wheel projects through an opening 18 in a piece of felt 19 which serves as a wiper for clearing measurement surface 17 of metal chips and other foreign particles which might interfere with operation of the measuring device.

A gross measurement indicator dial 20, calibrated in inches and tenths of inches, is disposed on the upper surface of the housing and is coupled directly to the shaft (not shown) which supports the metering wheel. A fine measurement indicator 21 for indicating small increments of measured travel is also mounted to the upper surface of the housing. Indicator 21 includes a dial plate (not shown) calibrated in hundredths and thousandths of an inch and a rotatable pointer (not shown) which cooperates with the dial plate and which is coupled to the metering wheel via an anti-backlashed motion-amplifying gear train (not shown); see Pat. 3,377,929. Any angular movement of the metering wheel is immediately manifested by indicators 20 and 21, which, in combination, serve to indicate the distance which the metering wheel has travelled along the measurement surface.

A male dovetail member 22 is secured to the underside of housing 14 and has its length aligned parallel to the elongate extent of housing 14, which extent is also preferably disposed perpendicular to measurement surface 17 during use of the measuring device. The male dovetail member cooperates in a female dovetail groove 23 provided in the upper surface of a mounting block 24 which comprises the upper component of mounting assembly 12. The rear end of the dovetail member is engaged by a finger 25 which extends radially from a hollow sleeve 26 disposed circumferentially about a pin (not shown) which has one end thereof secured to a knob 27 and the other end threaded into mounting block 24. A spring (not shown) is disposed within the sleeve and cooperates between the sleeve and the mounting block to bias the sleeve toward knob 27. By engaging finger 25 with the rear end of dovetail member 22 and by turning knob 27 to advance the sleeve into mounting block 24, a loading force of desired magnitude is applied from the spring to the dovetail member to bias the dovetail member and housing 14 toward measurement surface 17. The loading force applied to the housing is sufficient that metering wheel 15 rolls frictionally along measurement surface 17, and pursuant to practice of this invention, faithfully follows without slippage the movement of the lathe carriage relative to the lathe bed. It is preferred that the biasing force applied to the housing be at least twelve pounds to maintain proper tracking pressure between the metering wheel and the measurement surface.

It should be understood, however, that the above-specified force values apply to the structure illustrated, which structure is a "Trav-A-Dial" friction wheel measuring device. In a "Trav-A-Dial" friction wheel measuring device, the motion amplification factor (gear ratio) defined by the gear train which couples metering wheel 15 to fine indicator 21 is 60:1. It will be understood, however, that if lower motion amplification factors are involved, or if metering wheels of sizes other than the six-inch circumference metering wheel encountered in the "Trav-A-Dial" are utilized, somewhat smaller values of biasing force may be acceptable.

It is desired that the dovetail member be snugly slidable in the mounting block during use of the device to accommodate local irregularities in measurement surface 17.

The constructional details of mounting block 24, including sleeve 26 and knob 27 are illustrated in greater detail in commonly owned Pat. 3,378,929, cited above.

In FIGS. 1 and 2, as well as in other figures of the accompanying drawings, the plane of rotation of the metering wheel is represented by phantom line 29, and the axis of rotation of the metering wheel is represented by phantom line 30.

Mounting block 24 is supported on the upper end of a mounting pedestal 32, the lower end of which is securely affixed to lathe carriage 11, as by bolts 33. The upper end of the pedestal terminates in a peripheral flange 34. A pair of setscrews 35 are threaded through flange 34 to abut but not penetrate the lower surface of mounting block 24. The setscrews have their upper ends disposed above flange 34. It is also preferred that screws 35 be disposed along a line which, in the completed installation of the measuring device on the lathe carriage, is perpendicular to planar measurement surface 17.

The mounting block is held down by pedestal 32 by a pair of bolts 36 which are passed through oversized holes 37 in flange 34 into threaded engagement with block 24. Bolts 36 are disposed along a line which lies midway between screws 35 and is perpendicular to the line along which the screws are disposed.

Screws 35 are adjustable in flange 34 to vary the pitch or tilt (angle $\gamma$ in FIG. 4) of the plane of wheel rotation relative to measurement surface 17 so that the effective circumference of metering wheel 15, relative to its maximum six-inch circumference, may be selected for the reasons set forth in Pat. 3,307,265. That is, as illustrated in FIG. 3 (a fragmentary elevation view of a portion of metering wheel 15), the peripheral surface of the metering wheel is not a right circular cylinder. Rather, it is an approximation of a portion of a sphere which has a radius of curvature, in planes passing through wheel axis of rotation 30, which has a finite value considerably greater than the radius of the wheel. In other words, the intersection of a plane radially of the wheel with the circumferential surface of the wheel defines a portion of a circle (or an approximation of a portion of a circle) which has a radius substantially greater than the radius of the wheel. This configuration of the external surface of the wheel is provided so that measuring device 10 may be adjusted relative to the movable element to which it is mounted for the purposes of compensating for measurement errors produced by the difference between the values of Young's modulus of elasticity (E) and Poisson's ratio ($\mu$) for the material from which the metering wheel is made, on the one hand, and corresponding values for the material defining measurement surface 17, on the other hand. In this regard, see Pat. 3,307,265, cited above, in which the nature of these measurement errors, attributable to a metal gathering effect, is more fully described. For the purposes of this invention, it is important to note that the magnitude of such errors involves not only the relative values of Poisson's ratio and Young's modulus, but also the magnitude of the force with which the metering wheel is engaged with the measurement surface.

It is desired that mounting pedestal 32 and mounting block 24 be made as rigid as possible. The reasons why such rigidity is desired will be apparent from the following description.

Heretofore, it was always thought desirable to mount measuring device 10 so that plane of rotation 29 of metering wheel 15 lay parallel to the line 43 of movement of lathe carriage 11 relative to lathe bed 13, regardless of whether plane 29 was inclined relative to the measurement surface in the manner indicated in FIG. 4. Such parallelism between the plane of rotation of the metering wheel and the direction of movement of the lathe carriage along the lathe bed was desired to prevent the metering wheel from tracking skew to line 43. As set forth in Pat. 3,378,929, tracking of the metering wheel grossly skew to the direction of gross movement of the housing relative to the measurement surface causes the measuring device to indicate less travel than the actual amount of translatory movement to which the housing is subjected, thereby producing measurement errors. It was found, however, that where the device was used to measure distances of relative travel greatly in excess of the circumference of the metering wheel, errors in repeatability were encountered even where the device was mounted to have the plane of rotation of the metering wheel precisely parallel to the direction of such relative travel. It was found that these repeatability errors began to appear only after the device had travelled a definite distance along the measurement surface, the extent of which distance varied for a given measurement device from installation to installation, but which in a given installation was always constant. For example, a given measuring device might be used on one lathe to measure relative travel of the carriage along the lathe bed and be found to manifest unaccountable errors after travel exceeded, say, eighteen inches. The same device would then be mounted in the previously preferred manner to another lathe of like manufacture and model number, and would there be found to produce unaccountable repeatability errors after travel exceeded, say, twenty-four inches. It was found that such error was essentially independent of the biasing force initially applied to housing 14 by the mounting assembly and was also independent of the initial pitch of the plane of wheel rotation relative to the measurement surface (see FIG. 4 hereof). Such errors were found to exceed the rated accuracy of the device, and therefore were ascribed to some undefined cause associated with the particular machine tool to which the device was mounted at any given time. The identification of the source of such measurement errors constitutes a part of this invention as a whole.

With reference to the accompanying drawings, the ultimate cause of the error described immediately above is non-reciprocal deflection of the lathe carriage, for example, and of the bracketry by which the measurement device is mounted to the carriage of a type productive of (1) skew tracking of the metering wheel relative to the direction of gross relative movement between the lathe bed and the lathe carriage, (2) variations in the pitch ($\gamma$) of the metering wheel relative to the measurement surface, or (3) variations in the force of engagement of the metering wheel with the measurement surface. These three effects may be produced simultaneously or separately by non-reciprocal deflection of the lathe carriage, and of the mounting structure for the measuring device, relative to the lathe bed.

The non-reciprocal nature of these deflections of the lathe carriage relative to the lathe bed is of great significance to the problem of repeatability errors. The deflections are non-reciprocal in that they are different in nature and magnitude for one direction of travel of the carriage along the bed than for travel in the opposite direction. If these deflections were reciprocal, i.e., the same in both directions, the device would produce repeatable measurements.

The deflection induced tendency of the metering wheel to track skew to the direction of gross relative movement of the lathe carriage along the lathe bed is not directly a source of concern. Skew tracking of the metering wheel, however, produces a change in the pitch $\gamma$ of the metering wheel and often also a difference between the force of engagement of the wheel with the measurement surface during movement of the carriage in opposite directions.

Assume that Cartesian coordinates are applied to the lathe shown in FIGS. 6 and 7 such that the X axis is aligned with the direction of gross movement of the carriage relative to the bed. the Y axis is normal to the measurement surface, and the Z axis is in the plane of the measurement surface normal to both the X and Y axes. Relative to such a coordinate system, housing 14 of measuring device 10 could have six degrees of freedom, namely, translation along each of the three axes and rotation or pivoting about each of the three axes. Only three of these six degrees of freedom are of concern as regards measurement accuracy or repeatability. Rotation of the measuring device about the Y axis is seen to produce skew tracking, and rotation of the device about the X axis is seen to produce a variation in the value of angle γ so as to produce a variation in the effective diameter of the metering wheel. Translation of the measuring device along the Y axis will produce a variation of the force of engagement of the metering wheel with the measurement surface, thereby producing a variation in the magnitude of the metal gathering effect relative to which angle γ has significance. X axis translation produces no problem for the reasons set forth below. Z axis translation is either no problem (the metering wheel slides along the measurement axis in much the same manner as the pickup wheel of the metering wheel with the measurement surface, axis of rotation) or, because of the forceful engagement of the metering wheel with the measurement surface, is reflected as X axis rotation by reason of deflection of the mounting structure for the measuring device. Z axis rotation is reflected as Y axis translation in view of the slidability of dovetail member 22 in mounting block 24.

Thus, with reference to FIGS. 6 and 7, measuring device 10 is mounted via mounting assembly 12 to lathe carriage 11 so that metering wheel 15 rides along a machined surface 17, the measurement surface, of a guireway or rail 38, two of which are provided on the lathe bed for supporting carriage 11 for rectilinear movement on the bed. The ways and the lathe carriage are arranged so that the carriage is constrained to have only one degree of freedom (horizontal reciprocatory motion in the X direction) relative to the bed. The carriage is driven along the lathe bed in response to rotation of a leadscrew 39 (but more commonly in response to operation of a rack and pinion mechanism, not shown) with which the carriage is engaged in a conventional manner. It will be observed from FIG. 6 that the point of engagement of the leadscrew with the carriage is displaced from the center of mass 40 of the carriage. Also, it is apparent that some amount of friction is present between the cooperating surfaces of guideways 38 and the carriage, and such friction varies depending upon the direction of movement of the carriage. The result is that movement of the carriage along the lathe bed causes moments and deflecting forces to be developed in the structure of the carriage; such moments are produced about and along each of the X, Y and Z axes to one extent or another. Since the carriage is fabricated of metal which has inherent resiliency, the moments and forces developed in the carriage result in some deflection of the carriage along and/or about each of the X, Y and Z axes. The carriage itself is not absolutely rigid as might be thought to be the case.

The structure of the lathe carriage is complex, and thus the nature of the deflections which are produced in the carriage as its movement along the lathe bed both commences and continues is complex. The magnitudes of the deflecting moments and forces are certain to be different depending upon whether the carriage is moving from right to left, or from left to right, or whether the carriage is being moved during an actual machining operation; as a practical matter, carriage movement during a machining operation constitutes only a small portion of all movement of the carriage and is not directly dealt with by this invention. Because of the complexity of the deflections generated in carriage 11 during movement along bed 13, and because the deflections are different from lathe to lathe, as well as from machine tool to machine tool, the method of this invention is set forth below by means of a simplified example relative to the lathe.

The pertinence of this example to other machine tools should be readily apparent to workers skilled in the technology to which this invention relates.

In FIG. 6, line 41 represents the attitude in space of the surface of the carriage to which the measuring device is mounted when the carriage is stationary relative to the lathe bed. As the carriage is moved to the left along the lathe bed, the driving load applied to the carriage causes the support location of the measuring device to deflect angularly through angle β into a position represented in FIG. 6 by line 42. The angle of skew of the plane of rotation of the metering wheel (see FIG. 5) relative to the line 43 (the line of gross relative movement between the lathe carriage and the lathe bed) is angle β reflected at the point of engagement of the metering wheel with surface 17; the relationship between the value of angle β and the value of angle α is determined by the geometry of the particular structure to which the measuring device is mounted and by the geometry and stiffness of mounting assembly 12 and its supporting bracketry.

It was mentioned above that mounting assembly 18 is made as rigid as possible. It will be realized, however, that the mounting assembly and its supporting bracketry are not absolutely rigid but will in fact behave as an extremely stiff spring in response to the application of loads to the assembly. Thus, the mounting assembly has some measure of compliance relative to forces and moments applied to the metering wheel in all directions, including parallel to wheel axis of rotation 30. The structure of the measuring device also has a small amount of inherent compliance relative to loads applied to the wheel. In fact, it was the compliance of the mounting assembly and its supportive bracketry which, in first generation friction wheel measuring devices, obscured the problem which has been identified and met by this invention. That is, short travel of the metering wheel along the measurement surface does not necessarily produce readable repeatability errors because the mounting assembly and its supporting bracketry is sufficiently elastic to allow the wheel to roll throughout short distances of travel without any lateral skidding.

Figure 8:
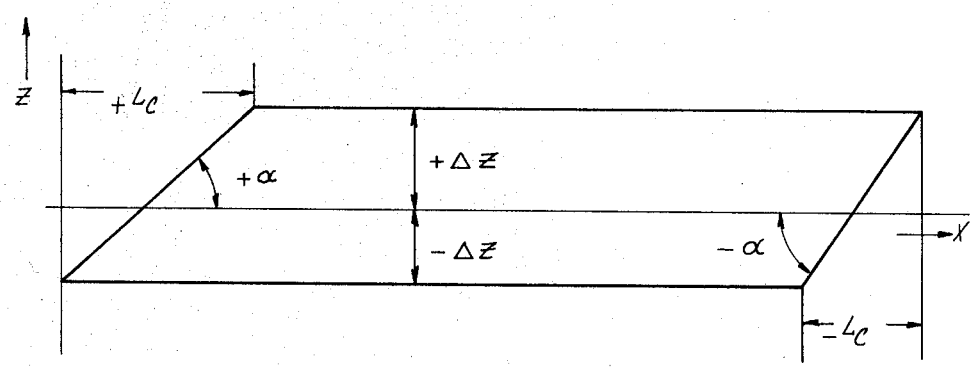
FIG. 8 is a graphic representation of the path travelled by the point of contact of the metering wheel with the measurement surface during a large round-trip movement of the carriage along the lathe bed in the absence of the practice of this invention.

The manner in which measuring device 10 was mounted prior to the development of the present invention has been described above, and the operation of the device when so mounted is illustrated in FIG. 8 which represents the path of the point of engagement of the metering wheel with the measurement surface. Relative to the drawings and consistent with the above-described assumption regarding Cartesian coordinates, assume that travel from right to left along line 43 (the direction of intended gross relative movement between the carriage and the bed) of the metering wheel is travel in the positive X direction, and that travel of the wheel upwardly along measurement surface 17 is travel in the positive Z direction. As soon as the carriage begins to move to the left (FIG. 6), wheel plane of rotation 29 moves out of parallelism with line 43 by angle α such that the wheel tends to track along surface 17 in a direction skew to line 43. Skew tracking of the wheel results in the application of force $F_z$ to the wheel in the Z direction according to the relation $F_z = C_{F_z} \cdot F_y$, wherein $F_y$ is the loading force applied to the wheel in the Y direction by mounting assembly 12 and $C_{F_z}$ is the coefficient of friction between the wheel and the measurement surface in the Z direction. Since deflection δ of a structure times the stiffness K of the structure equals the magnitude of the deflecting force, $K_z \cdot \delta_z = C_{F_z} \cdot F_y$, $\delta_z$ being the deflection in the Z direction associated with the compliance of mounting assembly 12 and the measuring device. The point of contact of the metering wheel with the measurement surface will have a component of motion in the Z direction until the mounting assembly has deflected an amount equal to $F_z$ divided by the stiffness (spring rate) of the mounting assembly and its supporting bracketry. The distance travelled in the X direction at such time is $L_c = \delta_z/\tan \alpha$; the wheel will slip a small amount as soon as travel in the X direction exceeds $L_c$. For short increments of travel of the carriage along the lathe bed less than $L_c$, no errors directly attributable to $\alpha$ are discerned. Because $\alpha$ is peculiar to the particular environment of the measuring device, $L_c$, the critical length in the X direction of skew travel of the wheel before slip is manifested, is also peculiar to the particular environment. Because the deflecting moments and forces are non-reciprocal, $\alpha$ will have different values for different directions of movement of the carriage along the lathe bed; the result is errors in repeatability of the measuring device.

As noted above, mounting assembly 12, the bracketry which supports the mounting assembly on the lathe carriage, and the measuring device itself all have some degree of compliance to moments and loads imposed thereon in various directions. The Z-direction loads imposed upon the metering wheel as a result of its tendency to track skew to line 43 as the carriage is moved along the lathe bed in turn imposed upon the mounting assembly, the bracketry and the device itself a moment about the X axis. Such X-axis moment causes the mounting assembly, the bracketry and the internal mechanism of the device to deflect in a manner productive of a variation in the tilt angle $\gamma$ of the metering wheel. Assume that such X-axis moment is applied in a clockwise manner (see FIG. 1) about the X-axis as the carriage moves from right to left (FIG. 6) along the lathe bed. A clockwise moment about the X-axis produces a deflection which causes a reduction in the value of desired tilt angle $\gamma$. Because the periphery of the metering wheel is configured as shown in FIG. 3 and as described above, a reduction in tilt angle $\gamma$ means that the metering wheel has a larger-than-desired effective diameter for travel from right to left along measurement surface 17.

When the lathe carriage is driven in the opposite direction (from left to right as viewed in FIG. 6), the directions in which deflecting forces and moments are applied to the lathe carriage, the mounting assembly, the bracketry for the mounting assembly, and the measuring device are reversed and the magnitudes of the deflecting forces and moments are altered, not merely reversed in direction. Accordingly, the skew tracking angle of the metering wheel relative to line 43 is reversed and the magnitude of such angle is changed. In this case, the metering wheel tilt angle $\gamma$ is increased to effectively reduce the effective diameter of the metering wheel. Since $+\Delta\gamma$ (right to left travel) does not equal $-\Delta\gamma$ (left to right travel), the metering wheel senses different distances of travel in opposite directions even though actual travel in one direction is equal to actual travel in the opposite direction. The result is a repeatability error.

It is seen, therefore, that because of cross-coupling effects, skew tracking of the metering wheel also produces changes in the tilt angle of the metering wheel relative to the measurement surface. Cross-coupling effects also cause skew-tracking to be manifested as changes in the force of engagement of the metering wheel with the measurement surface. That is, with reference to FIG. 1, moments acting clockwise about the X-axis produce both rotation of the metering wheel about the X-axis in a manner reducing metering wheel tilt angle $\gamma$ and translation of the metering wheel along the Y-axis away from the measurement surface so as to reduce the metering engagement force. Counterclockwise moments about the X-axis both increase the tilt angle and the metering wheel engagement force. As noted above, the magnitude of the metal gathering effect as to which the peripheral configuration of the metering wheel has pertinence is in part dependent upon the magnitude of the metering wheel engagement force. Thus, the phenomenon requiring tilt angle $\gamma$ for corrective purposes varies in magnitude depending upon the direction of travel of the metering wheel along the measurement surface.

FIG. 8 is a graphic summarization of the foregoing description. FIG. 8 represents the path traced by the point of contact of the metering wheel with measurement surface 17 as the carriage is moved through one of many cycles back and forth along the lathe bed from and to a reference position. As the carriage is moved in the positive X direction, the metering wheel tracks without slippage skew to the X-axis through distance $+L_c$, at which point the mounting assembly and its supporting bracketry are no longer compliant to forces in the Z direction. During movement in a negative X direction, the skew tracking angle $-\alpha$ is different from the former skew tracking angle $+\alpha$, and a different slip-free distance $-L_c$ is applicable. Also, the maximum displacement $+\Delta Z$ of the point of contact relative to the arbitrary X axis is different for $+X$ travel than it is for $-X$ travel.

As a practical matter, $+\alpha$ and $-\alpha$ are such small angles that their cosines are effectively unity. Therefore, no sensible measurement or repeatability errors are produced directly by skew tracking of the metering wheel along the measurement surface. As shown above, skew tracking produces such sufficient second order effects on $\gamma$ and $F_x$ as to contribute appreciably to the total repeatability error.

The foregoing example illustrates the manner in which rotational deflection of the lathe carriage about the Y axis contributes to repeatability errors. Rotational deflections about the X axis and translational deflections along the Y axis also contribute directly to the generation of repeatability errors. Because of cross-coupling effects, all deflections contribute to the generation of repeatability errors.

It should be very clearly understood that the foregoing example has been presented pursuant to the assumption that the measuring device is mounted to the lathe carriage in the manner directed by the prior art, i.e., with the plane of rotation of the metering wheel aligned parallel with line 43 of gross relative movement of the carriage when the carriage is stationary relative to the lathe bed.

It will be readily apparent from the foregoing that the causes and extent of a repeatability error for measuring device 10 can be determined analytically relative to a particular machine tool, but only with great difficulty and expenditure of time. Therefore, in basic terms, this invention resides in an intentional misalignment of housing 14 angularly of the Y-axis relative to line 43 by an amount which compensates for all the simultaneously occurring deflections of carriage, mounting assembly, and mounting assembly bracketry productive of repeatability errors, and the extent and direction of such misalignment preferably is determined by an empirical process. That is, the measuring device is initially mounted to lathe carriage 11, for example, so that the plane of rotation of its metering wheel is parallel to line 43, i.e., so that wheel plane 29 is parallel to the X-axis, and so that the housing has that degree of tilt (angle $\gamma$) necessary to produce accurate measurements in view of the metal gathering effect. Dials 20 and 21 are adjusted to show a zero reading. The carriage is then moved several times (say ten times) back and forth as far as possible along the lathe bed from its original position which preferably is against a fixed stop defined by the structure of the lathe. Because of the factors described above, the device will show a measurement error after the first traverse of the carriage along the lathe bed, and such errors for each traverse should accumulate additively to demonstrate that the error is essentially one of repeatability rather than of measurement accuracy. After the several traverses have been completed, dials 20 and 21 will show a definite value different from the initial zero reading. Bolts 36 are then adjusted, with the carriage stationary, in such manner that fine measurement indicator 21 shows travel of the metering wheel in a direction returning the indicator to a zero reading. The indicator will show such an effect because, as shown in FIG. 2, such adjustment of bolts 36 causes housing 30 to move angularly about the points of setscrews 35. That is, the point of contact of the metering wheel with the measurement surface will move along an arc having a radius R and a center at the top of setscrews 35. As a rule of thumb applicable to "Trav-A-Dial" measuring devices, bolts 36 are adjusted to drive indicator 21 almost to zero if the travel of the carriage in each traverse is about fifteen inches or less; if the travel in each traverse is about thirty inches, the adjustment is made to drive the indicator halfway to a zero reading, and an adjustment driving the indicator one-fourth the way to a zero reading is appropriate if the traverse distance is about sixty inches or more.

The initial adjustment of the housing angularly of the lathe carriage by the above-described procedure may not be sufficient to completely correct for repeatability errors. Therefore, the carriage is traversed again several times back and forth along the bed, and the cumulative residual error shown at this time by indicator 21 is noted. If the error is now manifested in a direction opposite to the error produced during the series of traverses of the carriage, screws 35 are adjusted, preferably in accord with the foregoing rule of thumb, to produce movement of the point of contact of the metering wheel with the measuring surface in an opposite direction along the measuring surface. By this empirical process, an at-rest skew tracking angle is intentionally programmed into mounting mechanism 12. As a result a corrective "error" equal in magnitude and opposite in sign to the aggregate complex repeatability error is pre-set into the installation of the measuring device.

From the foregoing description, it is apparent that this invention provides a simple and effective method of mounting a friction wheel measuring device to a machine tool, for example, so that repeatability errors are eliminated. The method is effective regardless of the amount of actual travel which the device is required to monitor. The method produces the desired error correction in such manner that the methods described in Pat. 3,307,265 can be practiced simultaneously with the method of this invention or independently of the present method. Moreover, this invention inherently compensates for such errors as may be produced by deflection of mounting assembly 12 in response to internal friction in measuring device 10.

It will be apparent that this invention may be used to advantage with any friction wheel measuring device in essentially any environment or installation; a lathe has been referred to above merely for the purposes of example. It is not necessary that the measuring device have a motion amplification capability or a metering wheel configured as shown in FIG. 3. The invention has been described herein with reference to a "Trav-A-Dial" measurement device only for the purposes of convenience and illustration in furtherance of an explanation of the advance provided by the invention.

What is claimed is:

1. In an installation on the first of two relatively movable elements having only one degree of freedom of gross movement therebetween, the extent of which is to be measured, of a friction wheel distance measuring device having a smooth surfaced metering wheel rotatably mounted to the first element to have its rim projecting into contact with a surface of the second relatively movable element which lies parallel to the direction of gross relative movement, the installation also including means biasing the wheel sufficiently forcefully into contact with the surface that the wheel rolls faithfully on the surface during gross relative movement of the elements, and means driven by the wheel for indicating the extent of travel of the wheel along the surface, an improved method of installing the device to assure repeatability of measurements obtained thereby which comprises the steps of determining the magnitude of the repeatability error produced during gross relative movement of the elements with a mounting of the device arranged such that the plane of wheel rotation is parallel to the direction of gross relative movement when no relative movement exists between the elements, and adjusting the mounting of the wheel on the first element so that, when the elements are stationary relative to each other, the plane of rotation of the wheel is skew to the direction of gross relative movement by an amount adequate to effectively cancel the repeatability error.

2. The method according to claim 1 wherein the method is performed by
   (1) moving the first element relative to the second element a number of times from and back to a reference position of the first element relative to the second element, to produce a discernible repeatability error,
   (2) with the elements stationary, adjusting the wheel angularly on the first element in a manner productive of wheel movement along the surface in a direction which operates the indicating means to reduce the repeatability error, and
   (3) repeating the cyclic moving and the adjusting procedures until the indicating means shows no error upon return of the first element to the reference position.

3. The method according to claim 1 wherein the first and second elements are components of a machine tool.

4. The method according to claim 1 wherein the one degree of freedom of relative movement is linear movement.

5. The method according to claim 1 in which the plane of rotation of the wheel is tilted a selected amount about the direction of gross relative movement relative to the measurement surface.

6. In an installation on the first of two relatively movable elements having only one degree of freedom of gross movement therebetween, the extent of which is to be measured, of a friction wheel distance measuring device having a smooth surfaced metering wheel rotatably mounted to the first element to have its rim projecting into contact with a surface of the second relatively movable element which lies parallel to the direction of gross relative movement, the installation also including means biasing the wheel sufficiently forcefully into contact with the surface that the wheel rolls faithfully on the surface during such gross relative movement of the elements, and means driven by the wheel for indicating the extent of travel of the wheel along the surface, an improved method of installing the device to assure repeatability of measurements obtained thereby which comprises the step of disposing the housing on the first element so that, when the elements are stationary relative to each other, the plane of rotation of the wheel is skew to the direction of gross relative movement by an amount adequate to compensate for repeatability errors which would be produced were the wheel plane of rotation parallel to the direction of gross relative movement when the elements are stationary relative to each other.

References Cited

UNITED STATES PATENTS 3,436,954  4/1969  Eppler _____ 73—1(A)

SAMUEL S. MATTHEWS, Primary Examiner

U.S. Cl. X.R.

33—141